Jan. 11, 1944. R. EKSERGIAN Re. 22,416

FATIGUE-TESTING MACHINE

Original Filed Aug. 3, 1940 3 Sheets-Sheet 1

INVENTOR
Rupen Eksergian
BY John P. Barber
ATTORNEY

FATIGUE-TESTING MACHINE

Original Filed Aug. 3, 1940 3 Sheets-Sheet 2

INVENTOR
Rupen Eksergian
BY John P. Turbox
ATTORNEY

INVENTOR
Rupen Eksergian
BY John P. Tarbox
ATTORNEY

Reissued Jan. 11, 1944 Re. 22,416

UNITED STATES PATENT OFFICE 22,416

FATIGUE-TESTING MACHINE

Rupen Eksergian, Lansdowne, Pa., assignor to Edward G. Budd Manufacturing Company, Philadelphia Pa., a corporation of Pennsylvania Original No. 2,317,097, dated April 20, 1943, Serial No. 350,854, August 3, 1940. Application for reissue September 18, 1943, Serial No. 502,997

13 Claims. (Cl. 73—51)

The present invention relates to the testing of materials. More specifically it relates to mechanism for testing articles as to their capability of withstanding repeated stresses, that is, their capability of resisting fatigue, especially when subjected to periodic or vibratory stresses.

The invention contemplates a testing machine based on the principle of a vibration beam suitably damped thus controlling the amplitude of vibration and permitting an initial loading to be applied through the beam system to the specimen. A motor mounted to the beam with eccentric counter-weights is used as an external alternating impressed force on the system. It is well-known that a simple vibration system has its own natural period of vibration depending on the proportions of the mass and elasticity of the system. The vibration system in this testing machine consists essentially of the vibration beam hinged to one end and free to rotate about this hinged point as the inertia element. The beam is constrained in turn by helical springs, one below the beam and one above the beam, the latter of which is connected to the specimen. Neglecting the small elasticity of the specimen, the elastic system consists essentially on the top and bottom springs. The testing vibration beam can be turned to any natural pre-conceived operation by the proper selection of the inertia properties of the beam about its hinged points and the elastic properties of the spring. On the basis of a forced vibration, it is well-known that in approaching resonance, that is in approaching a speed corresponding to the natural frequency of the system, large amplitudes will occur, unless suitable damping is provided for. In this testing system the amplitude is controlled by a damping device when the speed of the motor vibrator approaches the natural frequency of the beam system.

An important feature of this machine is that it makes possible the testing of alternating loadings superimposed on an initial- or pre-load. This is accomplished by a jack placed beneath the bottom spring and jacking up the entire system so that the upper spring applies a definite-pre-load on the specimen. On starting the motor vibrator, the machine is brought up to a speed approaching resonance and the amplitude over and below the mean loading is controlled by means of the damping device. This control can also be made by a change in speed of the motor with a fixed damping course or by both methods. Thus a sensitive control of amplitude for vibration superimposed on a pre-load is attained. The pre-loading can be given any value whatsoever by changing the adjustment of the jack.

A specific example of such machine is described in the following specification and illustrated in the drawings accompanying the same, wherein.

In all the figures similar elements are indicated by the same reference characters.

Figure 1:
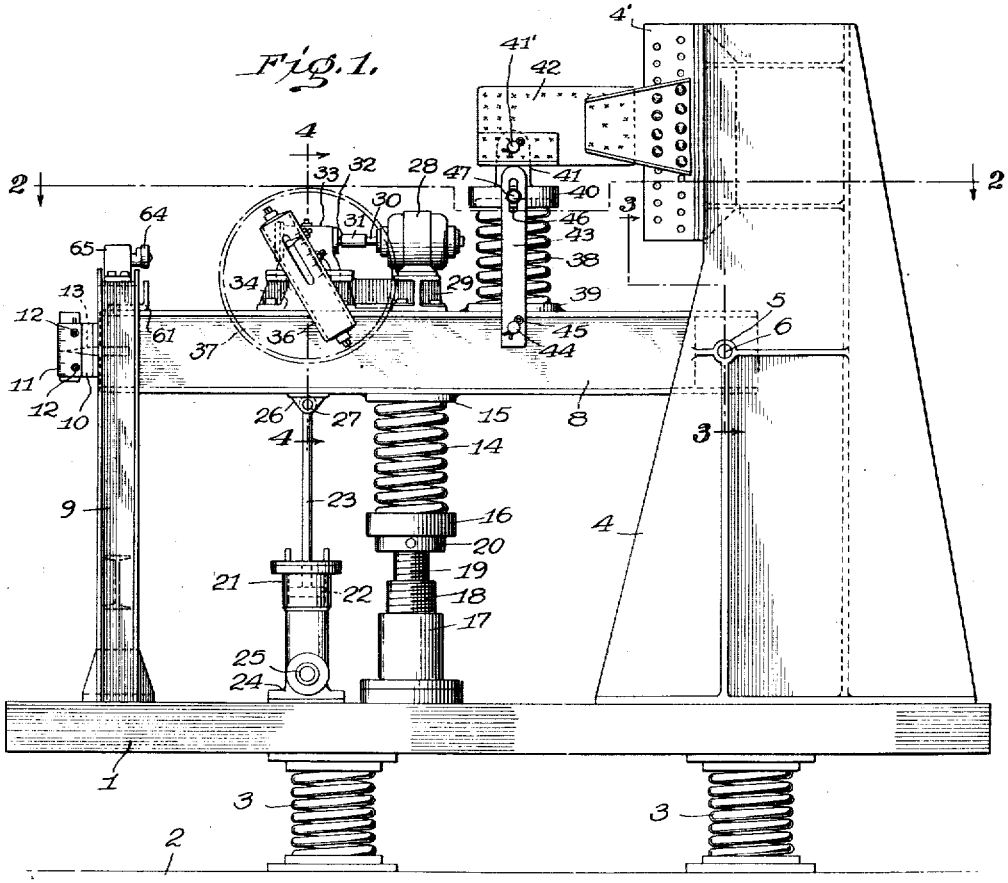
Fig. 1 is a diagrammatic side elevation of the fatigue testing machine.
Figure 2:
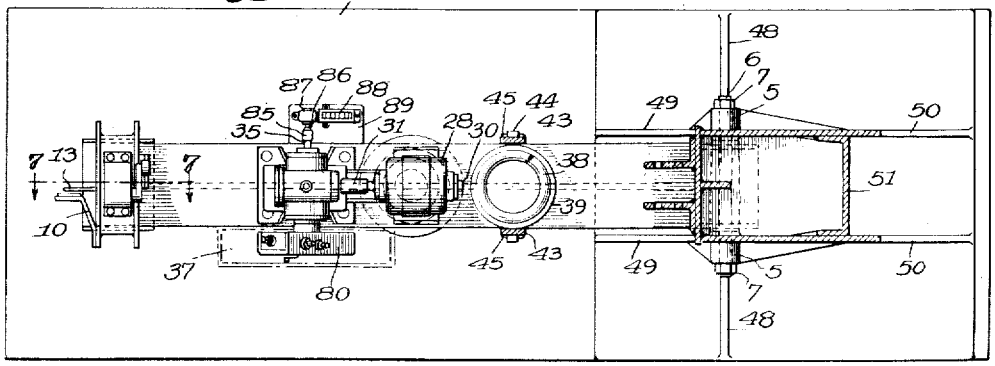
Fig. 2 is a plan view thereof, partly in horizontal section on the planes indicated by the broken line 2—2 of Fig. 1.
Figure 3:
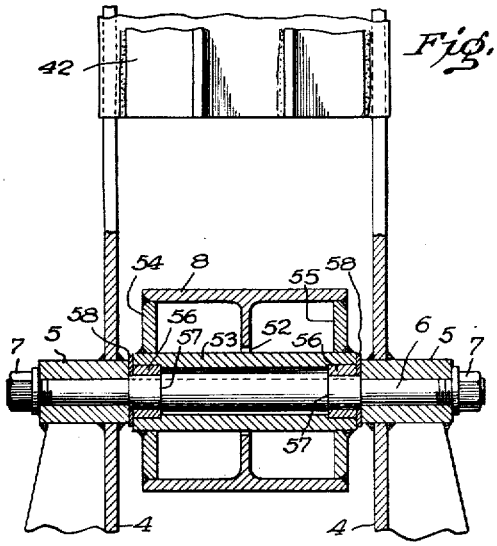
Fig. 3 is a fragmentary vertical section on the planes indicated by the broken line 3—3 of Fig. 1, and on an enlarged scale.
Figure 7:
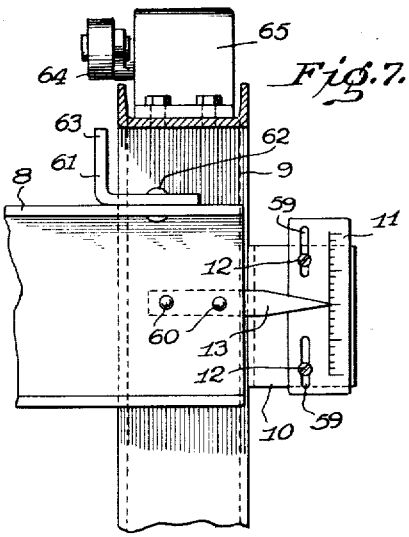
Fig. 7 is a fragmentary detail on an enlarged scale, showing the scale, and the pointer carried by the beam to cooperate therewith, to indicate the amplitude of the vibrations, this figure being partly in section on the plane indicated by the line 7—7 of Fig. 2.
Figure 4:
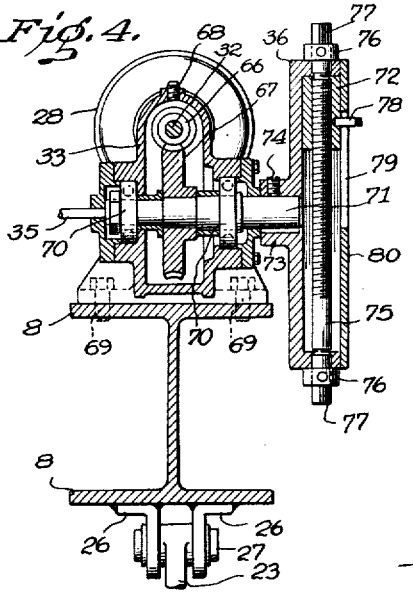
Fig. 4 is a fragmentary sectional detail, also on an enlarged scale, on the plane indicated by the line 4—4 of Fig. 1, showing the excentrically mounted rotary inertia member for producing the vibrations.
Figure 5:
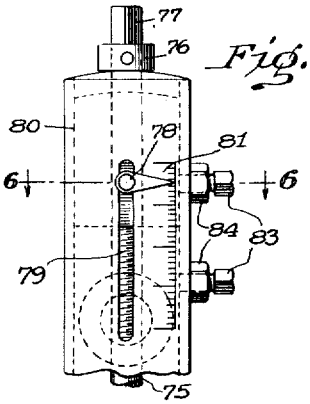
Fig. 5 is a fragmentary detail view of the adjustable inertia member on a still larger scale, showing the casing surrounding the same.
Figure 6:
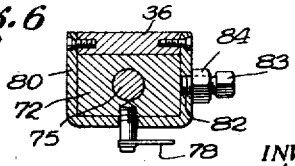
Fig. 6 is a corresponding horizontal section therethrough on the plane indicated by the line 6—6 of Fig. 5.

Referring first to Fig. 1, the device comprises a base 1 mounted on any suitable floor or support 2 by yieldable or resilient means, such as the springs 3 which act as shock absorbers, leaving the base 1 and the parts mounted thereon free to vibrate, while at the same time preventing any disagreeable vibration from reaching the floor 2.

A vertical column 4 is mounted on the base 1 near one end of the latter. This column has lugs or bosses 5 therein which support a shaft 6, nuts 7 being provided to retain the shaft in position. The shaft 6 serves as a pivot for the substantially horizontal arm or beam 8 which is mounted so as to be free to turn about said shaft except as restrained by other parts of the mechanism.

At or near the other end of the base 1 a substantially vertical guide or column 9 is mounted. On a bracket 10 of the column 9 is adjustably arranged a scale 11, such as by the screws 12 passing through slots 59. The scale 11 may be placed at the proper height to cooperate with a pointer 13 carried at 60 by the free end of the arm 8, so that the position of the arm 8 may thus be read on the scale.

A compression spring 14 bears in a cup 15 on the underside of the arm 8 and is supported in an opposed cup 16 at its lower end. A lifting device such as a screw-jack having a base member 17, differential screws 18 and 19 of the customary type and a plate 20, is inserted between the base plate 1 and the lower end of the spring 14.

The base 1 also carries damping means. These means comprise a cylinder 21 filled with a fluid, and within which operates a piston 22 at one end of a rod 23. The cylinder 21 is pivotally mounted on a base 24 by means of the pin 25, and the piston rod 23 is pivotally attached to the fitting 26 on the beam 8, by means of the pivot 27.

The means for producing the vibratory motion of the arm 8 comprises a motor 28 mounted on a base 29, the latter being secured to the arm 8 by bolts 69. The shaft 30 of said motor is connected by a suitable coupling 31 to the shaft 32 of a speed-reducing gearing 33, also mounted on the arm 8 by means of a suitable base 34. This gear comprises a worm 66 on shaft 32 and a worm wheel 67 on a shaft 71, the latter being supported by bearings 70. A hollow member 36 is fastened to shaft 71. A projecting enclosure 37 may be provided for the casing 36. The casing contains a weight or inertia element 72, which is adjustably supported by the threaded shaft 75, the latter being held by collars 76 and being provided with square heads 77. A pin 78 on said weight 72 projects through slot 79 in cover plate 80 and carries a hand 78 playing over a scale 81, 83 and 84 are set screws and lock nuts for holding the member rigidly in the casing 36.

A further resilient means, such as the spring 38, is mounted upon a suitable base 39 carried by the beam 8 and bears against a cooperating cup 40 placed on top of the spring, said cup 40 having an extension 41 which may be secured such as by a pin connection 41' to the test specimen 42 or may in certain cases merely abut against the specimen. The specimen is rigidly fastened to a supporting plate 4' at the upper end of column 4.

Links 43 may be provided at two opposite sides of the spring 38, and these links may be pivotally secured to the beam 8 such as by pin 44 held in place by the cotter pins 45, and to the cup 40 by pin 47 being connected to said cup 40 and passing through slots 46. This construction prevents disengagement of the parts when the test piece is removed.

In order to secure the required strength, the column 4 is built up with webs or flanges 48, 49, and 50 and a channel member 51.

The greater part of the beam is shown to be an I-beam structure. At the pivotal end an opening 52 is formed in the web of the I-beam to receive the sleeve 53. Plates 54 and 55 are welded or otherwise secured both to the sleeve and to the flanges of the I-beam 8 to provide a rigid connection between the sleeve and the said I-beam. Suitable bearing bushings 56, or if preferred roller bearings, may be provided to pivotally support the sleeve 53 on the shaft 6, which may have shoulders as shown at 57, to retain the bearing members 56 in proper position. 58 are spacing washers.

At the other end, a bracket 61 is secured at 62 to the upper side of beam 8. Above the upwardly projecting end 63 of the bracket 61, is located a contact device 64, which will be actuated when the end 63 strikes it and will control a safety device 65 of any suitable kind to shut off current from the motor in case the amplitude of motion of the free end of the beam 8 for any reason should become excessive enough to cause 63 to strike 64.

Shaft 71 is connected to a smaller shaft 35, and the latter controls by means of a coupling 85, a shaft 86 and gearing 87, a revolution counter 88 mounted on a bracket 89 carried by the beam 8.

The operation of the device is as follows:

A specimen, such as diagrammatically illustrated at 42, is secured to portion 4' of the column 4 and at another portion to the plunger 41. Then the jack 17–20 is adjusted to compress the springs 14 and 38 until the end of the specimen is under the desired mean load.

The violence of the vibration may partly be controlled by varying the position of the weight 72 by means of the screw 75. The frequency is, of course, dependent upon the speed of the motor 28, and the gear ratio of the reduction gearing, and may thus be controlled by varying the speed of rotation of the motor, or by changing the gear ratio, or both. The scale 11 is preferably so adjusted that the pointer 13 plays over its mid-position and the amplitude of the vibration will thus be indicated thereon.

The dashpot device 21, 22, and 23 will restrain the vibration to a degree dependent upon the adjustment of said dashpot, which thus affords an auxiliary means for controlling the amplitude of the vibration. The register 88 will give a count of the number of vibrations to which the test piece has ben subjected, proper multiplication being made in accordance with the ratio of the gearing 87. If the vibration should become excessive, due, for instance, to resonance conditions or rupture of the article under test, the upstanding end of the bracket 61 will strike the cooperating member 64 of the electric controller and will thus either shut off the device entirely or reduce the power supply to the motor to such extent that the vibration will again be decreased to a suitable safe amount.

Figure 8:
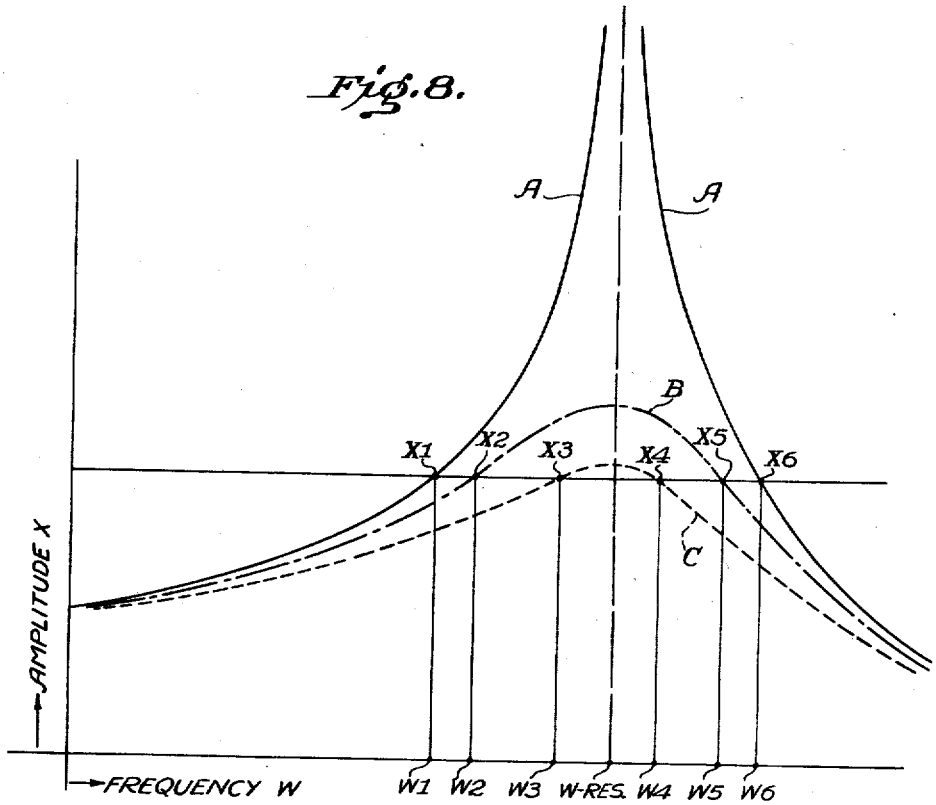
Figs. 8 and 9 are diagrams illustrating the principle of the function of the machine.
Figure 9:
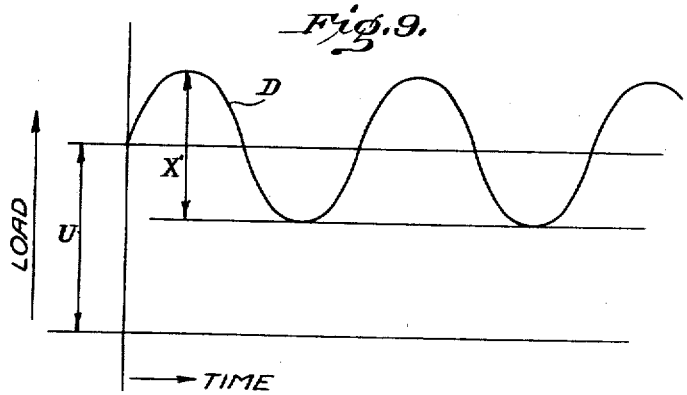

The principle of the invention shall now be explained by means of the diagrams of Figures 8 and 9. The vibratable system comprising the beam 8, the springs 14 and 38 and the other members supported by the beam—yet disregarding at first the damper 21, 22—has specific vibration properties. The relation between the frequency W and the amplitude X of this system is diagrammatically shown by the curve A in Figure 8. In approaching the resonance frequency W–RES of the system, the amplitude X would theoretically become infinite. By imparting vibrations of a certain frequency, for instance the frequency W1 and W6, any desired amplitude X on the curve A may be achieved as for instance indicated by the points X1 and X6. This regulation of the frequency gives, however, very little choice regarding the selection of amplitude and frequency to which the specimen can be subjected but to one amplitude belong only two specific frequencies.

It is, on the other hand, obvious that, for imitating conditions as they will arise in the actual use of a structure, it is desirable to coordinate within certain limits any frequency of vibration and any amplitude. This goal is achieved by the adjustable damping of the swinging system by means of the damper 21, 22. If the swinging system is damped, the curves of frequency and amplitude may take, dependent on the degree of damping, the form of the curves B or C of Figure 8. It is now possible to coordinate to the amplitude of the previously-mentioned points X1, X6 any frequency between the frequencies W1 and W6, such as the frequencies W2, W3, W4 or W5 to which the points X2, X3, X4 and X5 on the curves B and C, respectively, belong. It will be understood that the number of curves similar to the curves B and C below the curve A is infinite and that, therefore, within the natural limits of the system any desired frequency can be combined with any desired amplitude.

The amplitude is, as will be understood, a measure for the variations of load to which the specimen is subjected. By jacking up the spring 14 together with the beam 8 and the spring 38 by means of the jacks 17 to 20, the specimen will be subjected to a mean load U which is indicated in Figure 9 by a horizontal straight load line. The variations of the load which are due to the vibrations of the system are superimposed on this mean load and are indicated in the load-time diagram of Figure 9 by the curve D. The amounts of these variations in the load to which the specimen is subjected are designated in Figure 9 by X' and they are, as indicated before, a function of the amplitude X of the swinging system.

The invention is not restricted to the specific form of the machine shown in the drawings but it is obvious to those skilled in the art that all kinds of modifications and variations may be designed. It is among other things not necessary to use a beam which is journaled to the base, but the swinging mass may be guided by other means or may even be freely suspended between the two spring systems. It is also not necessary to arrange the beam horizontal, but any other arrangement, such as a vertical arrangement, would serve the purpose. Any means for imparting the vibrations to the swinging arm or mass may be used instead of the specific means shown in the embodiment, the same being true for the damping device and for the jack. Regarding the jack, it may be mentioned that its arrangement between the base and the spring 14 is no necessity but that it may be arranged at any place in the chain formed by the springs and the beam between the base and one point of the specimen. Finally, it may be mentioned that the new machine can easily be modified so as to subject the specimen to tensional stresses instead of to the compression stresses in accordance with the shown embodiment. All those modifications and variations and others which are not specifically mentioned are intended to be covered by the spirit and the language of the following claims.

What is claimed is:

1. In a device for testing materials a substantially rigid base, a stationary securing means for attachment to a point of a specimen to be tested, said means being rigidly supported by said base, a substantially rigid member pivotally supported by said base, means for imparting oscillatory motion to said member about its pivot, and a means in the nature of a spring being carried by said member and being adapted for attachment to another point of the specimen.

2. In a device for testing materials, a substantially rigid base, a stationary securing means for attachment to a point of a specimen, said means being rigidly supported by said base, a substantially rigid beam pivotally supported at one point of its length by said base, means for imparting oscillatory motion to said beam about its pivot, means for controlling the amplitude of said motion, a means in the nature of a spring being inserted between said base and said beam, and a second means in the nature of a spring being connected with a point of said beam remote from its pivot and being adapted for attachment to another point of the specimen.

3. In a device for testing materials, a base, a stationary securing means for attachment to a point of a specimen, said means being rigidly supported by said base, a beam pivotally supported by said base, means for imparting oscillatory motion to said beam about its pivot, a supporting means in the nature of a spring for the beam, and a means likewise in the nature of a spring being carried by said beam and being adapted for attachment to another point of the specimen under test.

4. In a device for testing materials, a base, stationary securing means for attachment to a point of a specimen, said means being rigidly supported by said base, a beam pivotally supported at one end by said base, means for imparting oscillatory motion to said beam about its pivot, means for controlling the amplitude of said motion, resilient means supporting said beam, means for adjustably pre-loading said resilient means, and a second securing means carried by said beam adapted for attachment to another point of the specimen.

5. In a fatigue testing machine, a base structure, a vibratable member, a first means in the nature of a spring inserted between said base and said vibratable member, a second means in the nature of a spring adapted to be inserted between said member and one point of a specimen, means for rigidly securing the specimen to said base, means for imparting a vibratory impulse to said member.

6. In a device for testing materials, a base, means on said base for holding a specimen in one region or point thereof, a vibratable member, means for imparting oscillatory motion to said member, supporting means in the nature of a spring for the member, another means in the nature of a spring being carried by said member and being adapted for engagement to another region or point of the specimen under test at a substantial distance from the first-named point or region.

7. In a testing machine according to claim 6, means for imparting an initial- or pre-load on said means in the nature of springs and thereby on the specimen.

8. In a testing machine according to claim 6 means for damping the amplitude of said vibratable member, said damping means being adjustable so as to vary the damping effect.

9. In a testing machine according to claim 6 means for damping the amplitude of said member; said means for imparting a vibratory impulse being adjustable so as to vary the frequency of the impulse; said damping means being adjustable so as to vary the damping effect; coordination of the adjustments of the damping means and of the vibration means determining together with the natural frequency of the system the frequency and amplitude of the movement of the vibratable member and thereby the frequency and the amount of the load change exerted on the specimen.

10. In a testing machine according to claim 6, means for damping the amplitude of said member; means for imparting an initial- or pre-load on said means in the nature of springs and thereby on the specimen; said means for imparting a vibratory impulse being adjustable so as to vary the frequency of said impulse; the damping means being adjustable so as to vary the damping effect; coordination of the adjustments of the damping means and of the vibration means determining together with the natural frequency of the system the frequency and amplitude of the movement of the vibratable member and thereby the frequency and the amount of the load change exerted on the specimen.

11. In a device for testing materials, a substantially rigid base member, a pair of securing means for attaching two different points of a testing specimen, a vibratable member guided by said base member, means for imparting vibratory motion to said vibratable member, a resilient element, one of said securing means being rigidly attached to one of said members, the other securing means being attached to one side of said resilient element, the opposite side of said resilient element being attached to the other member, the arrangement being thereby such that said resilient member and a specimen connected to said securing means are arranged in series between said base member and said vibratable member, and means for pre-loading said resilient element and a specimen connected to said securing means.

12. In a device for testing materials, a substantially rigid base member, a pair of securing means for attaching two different points of a testing specimen, a vibratable member, means for imparting vibratory motion to said vibratable member, a first resilient element element, a second resilient element, said first resilient element being inserted between said base member and said vibratable member, the one of said securing means being attached to one of said members, the other securing means being attached to one side of said second resilient element, the opposite side of said second resilient element being attached to the other member, the arrangement being thereby such that a specimen connected to said two securing means, said vibratable member and said resilient members are arranged in series between two points of base member, and means for imparting an initial load to said resilient members and a specimen connected to said securing means.

13. In a device for testing materials, a substantially rigid base member, a pair of securing means for attaching two different points of a testing specimen, a vibratable member guided by said base, means for imparting vibratory motion to said vibratable member, vibration-transmitting means adapted to yieldingly exert a force between two of its points and having a natural frequency of relative movement of those points, one of said securing means being attached to one of said members, the other securing means being attached to the one aforesaid point of said vibration-transmitting means, the other aforesaid point of said vibration-transmitting means being attached to the other member, the arrangement being thereby such that a specimen connected to said securing means and the part of said vibration-transmitting means between its said two points are arranged in series between said base member and said vibratable member, and means for imposing a pre-loading on said vibration-transmitting means and to a specimen to be tested.

RUPEN EKSERGIAN.

CERTIFICATE OF CORRECTION.

Reissue No. 22,416. January 11, 1944.

RUPEN EKSERGIAN.

It is hereby certified that error appears in the printed specification of the above numbered patent requiring correction as follows: Page 1, first column, line 28, for "turned" read --tuned--; and that the said Letters Patent should be read with this correction therein that the same may conform to the record of the case in the Patent Office.

Signed and sealed this 30th day of May, A. D. 1944.

(Seal)

Leslie Frazer
Acting Commissioner of Patents.